US009569018B2

(12) United States Patent
Kang et al.

(10) Patent No.: US 9,569,018 B2
(45) Date of Patent: Feb. 14, 2017

(54) FLEXIBLE DISPLAY DEVICE

(75) Inventors: Seok-Myong Kang, Gyeonggi-do (KR); Shi-Yun Cho, Gyeonggi-do (KR); Ho-Seong Seo, Gyeonggi-do (KR); In-Kuk Yun, Gyeonggi-do (KR); Youn-Ho Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 240 days.

(21) Appl. No.: 13/618,086

(22) Filed: Sep. 14, 2012

(65) Prior Publication Data

US 2013/0100053 A1    Apr. 25, 2013

(30) Foreign Application Priority Data

Oct. 20, 2011 (KR) .......................... 10-2011-0107735

(51) Int. Cl.
*G06F 3/041* (2006.01)
*G06F 3/03* (2006.01)

(52) U.S. Cl.
CPC ................. *G06F 3/041* (2013.01); *G06F 3/03* (2013.01); *G06F 2203/04102* (2013.01)

(58) Field of Classification Search
CPC ... G06F 3/03; G06F 3/041; G06F 2203/04102
See application file for complete search history.

(56) References Cited

U.S. PATENT DOCUMENTS

| 6,943,773 | B2* | 9/2005 | Wong et al. | 345/156 |
| 7,868,545 | B2* | 1/2011 | Hioki et al. | 313/511 |
| 7,927,666 | B2* | 4/2011 | Ajayan et al. | 427/385.5 |
| 2006/0274036 | A1* | 12/2006 | Hioki et al. | 345/156 |
| 2008/0018631 | A1* | 1/2008 | Hioki et al. | 345/206 |
| 2010/0011291 | A1 | 1/2010 | Nurmi | |
| 2010/0075024 | A1* | 3/2010 | Ajayan et al. | 427/66 |
| 2011/0134145 | A1* | 6/2011 | Moriwaki | G09G 3/3208 345/660 |
| 2011/0227822 | A1* | 9/2011 | Shai | 345/156 |
| 2012/0092363 | A1* | 4/2012 | Kim et al. | 345/618 |

FOREIGN PATENT DOCUMENTS

| KR | 100667569 | 1/2007 |
| KR | 100933710 | 12/2009 |

* cited by examiner

*Primary Examiner* — Nicholas Lee
*Assistant Examiner* — Richard Hong
(74) *Attorney, Agent, or Firm* — The Farrell Law Firm, P.C.

(57) ABSTRACT

Disclosed is a flexible display device adapted to accurately detect bending information when the flexible display device is flexed, bent or folded, and to be capable of variously controlling an image displayed on a screen on the basis of the detected bending information. The flexible display device includes a flexible touch screen part, and a bending detection part provided on the touch screen part, the bending detection part having an electrostatic capacitance or electric resistance that changes depending on a bending of the touch screen part, so as to detect bending information.

18 Claims, 8 Drawing Sheets
(1 of 8 Drawing Sheet(s) Filed in Color)

FLEXIBLE DISPLAY DEVICE

PRIORITY

This application claims priority under 35 U.S.C. §119(a) to an application entitled "Flexible Display Device" filed in the Korean Intellectual Property Office on Oct. 20, 2011 and assigned Serial No. 10-2011-0107735, the contents of which are incorporated herein by reference.

BACKGROUND OF THE INVENTION

1. Field of the Invention

The present invention relates generally to a flexible display device, and more particularly, to a flexible display device which is adapted to detect bending information, such as folding or bending of the flexible display device, and to output an image corrected on the basis of the bending information.

2. Description of the Related Art

Electronic devices are typically provided with a flat display device to reproduce an image.

Flexible display devices, which can be bent or rolled, tend to attract public attention. The term "flexible display device" commonly refers to display devices formed on and manufactured using a flexible substrate, such as a plastic, whereby the flexible display device can be flexed, bent or rolled while retaining the screen characteristics of an existing display device without being damaged The substrate is fabricated as thin and flexible as paper due to its durability against impact, excellent flexibility and toughness.

Thin Film Transistor (TFT) Liquid Crystal Display (LCD) devices, Organic Light Emitting Diodes (OLEDs), and other mainstream electrophoretic technologies are used to implement such a flexible display device.

Prior art related to such a flexible display device includes Korean Patent No. 10-0933710, registered on Dec. 16, 2009 and entitled "Display-Integrated Flexible Touch Screen With Tactile Sensor," and in Korean Patent No. 10-0667569 registered on Jan. 5, 2007 and entitled, "Flexible Display Device."

However, such conventional flexible display devices do not permit detection of the flexing or bending of the display device.

In addition, when such a flexible display device is bent or flexed, images are displayed on the screen thereof without being corrected in connection with the bending or flexing, which compromises a user's viewing of the images.

Furthermore, when such a flexible display device is bent or flexed, one or more area of a screen, which are not visible due to the deformation of the flexible display device, also display images, which causes unnecessary power consumption.

SUMMARY OF THE INVENTION

Accordingly, an aspect of the present invention is to solve the above-mentioned problems occurring in the prior art, and is to provide a flexible display device which is adapted to accurately detect bending information when the flexible display device is flexed, bent or folded, and to be capable of variously controlling an image displayed on a screen on the basis of the detected bending information.

Another aspect of the present invention is to provide a flexible display device which is adapted to correct an image displayed on a screen in accordance with a used condition of the flexible display device by detecting a change in position or angle caused in a wave-shaped part provided in the flexible display device, or to black out one or more areas on the screen, which are not needed to display an image, to reduce the power consumption of the flexible display device when such areas are produced as a result of bending or folding the flexible display device.

In accordance with an aspect of the present invention, there is provided a flexible display device including a flexible touch screen part, and a bending detection part provided on the touch screen part, the bending detection part having an electrostatic capacitance or electric resistance, which changes depending on a bending of the touch screen part, so as to detect bending information.

In accordance with another aspect of the present invention, there is provided a flexible display device, in which the bending detection part includes a first sheet part bonded to a lower side of the touch screen part to be flexibly deformable, the first sheet part having a first wave-shaped part formed on one side thereof in a wave shape, a second sheet part bonded to a lower side of the first sheet part to be flexibly deformable, the second sheet part having a second wave-shaped part formed on one side thereof in a wave shape, and a sensor part including plural sensors provided on the first and second wave-shaped parts in such a manner that the sensors provided on the first wave-shaped part are positioned opposite to the sensors provided on the second wave-shaped part, respectively, each of the sensors having an electrostatic or electric resistance, which changes when the touch screen part is bent.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the present invention will be more apparent from the following detailed description taken in conjunction with the accompanying drawings, in which.

DETAILED DESCRIPTION OF EMBODIMENTS OF THE INVENTION

Figure 1:
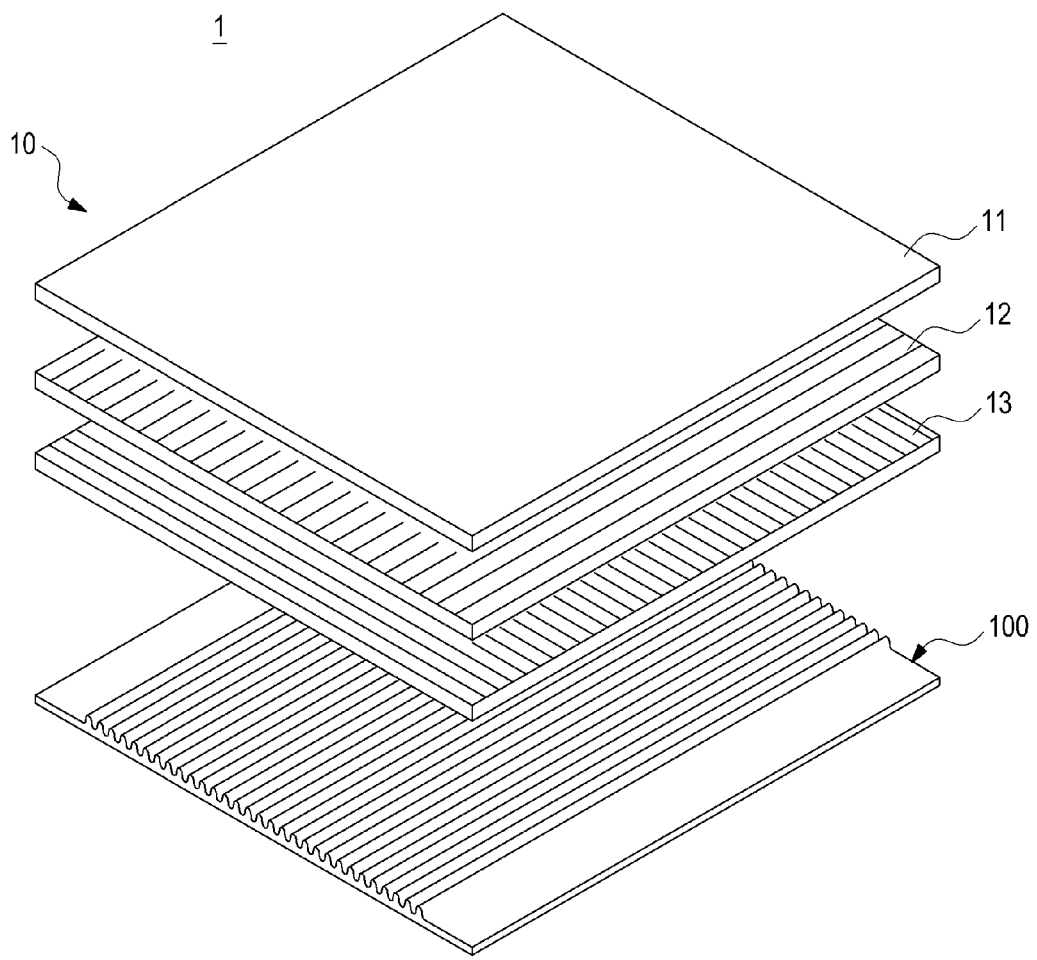
FIG. 1 illustrates a flexible display device in accordance with a first embodiment of the present invention.

Hereinafter, embodiments of the present invention will be described with reference to the accompanying drawings. In the following description, the same elements will be designated by the same reference numerals although they are shown in different drawings. In the drawings, the thickness of lines and sizes of components may be exaggerated for the clarity and convenience of description. The terminologies used hereinbelow are those defined in consideration of functions in the present invention, and different terminologies may be used in accordance with an intention of a user or an operator or a practice. Further, a detailed description of known functions and configurations incorporated herein will be omitted for the sake of clarity and conciseness.

The use of numbers such as "first" and "second" in embodiments of the present invention is to distinguish elements with the same name. However, the order of such elements may be optionally determined, and a description firstly made for one of such elements may be applied to the other element(s).

Figure 2:
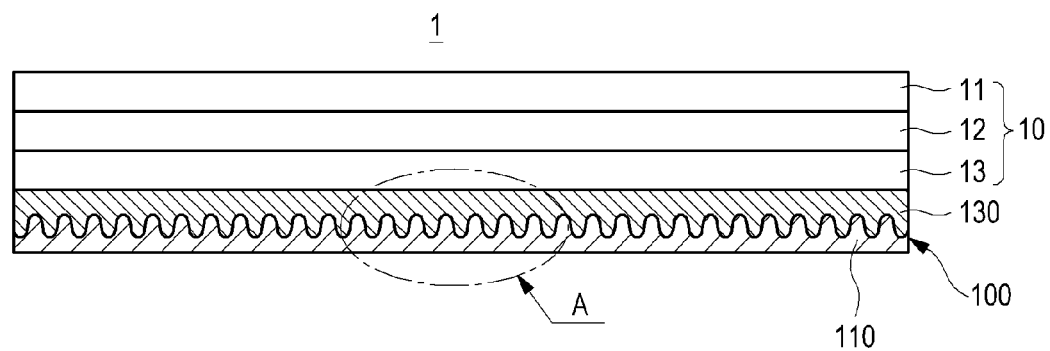
FIG. 2 illustrates the flexible display device of the first embodiment partially in cross-section.

FIG. 1 illustrates a flexible display device in accordance with the first embodiment of the present invention, and FIG. 2 illustrates the flexible display device of the first embodiment partially in cross-section.

Referring to FIGS. 1 and 2, the flexible display device 1 in accordance with the first embodiment of the present invention includes a touch screen part 10 and a bending detection part 100.

The touch screen part 10 is flexible so that it can be flexed, bent or rolled. The touch screen part 10 may output a screen desired by a user, or may serve as a User Interface (UI) to receive commands from the user. The touch screen part 10 employs a dual layer capacitive type construction including two Indium Tin Oxide (ITO) panels. However, this is merely an example, and any other construction may be employed if the construction is flexibly deformable and is capable of recognizing a screen touch when the user touches the screen to output an image.

The touch screen part 10 of the dual layer capacitive construction including two ITO panels includes a top film 11, a first layer 12 and a second layer 13.

The top film 11 is flexible, and outputs images. As the top film 11 is provided at the outermost area of the touch screen part 10, it is desirable that the top film 11 has such a high durability that the top film 11 can protect the flexible display device 1 from an external physical or mechanical impact. The top film 10 may be preferably formed from PolyEthylene Terephthalate (PET), PolyCarbonate (PC), PolyMethylMethAcrylate (PMMA), PolyEthyleneNaphthalate (PEN), PolyEtherSulfone (PES), Cyclic Olefin Polymer (COP), glass or tempered glass. However, any other material may be also employed if it is highly flexible and durable when it is provided at the outermost area.

The first layer 12 is provided beneath the top film 11 and includes ITO layer deposited parallel to each other in a first direction, and the second layer 13 includes e ITO layer deposited parallel to each other in a second direction which is perpendicular to the first direction. The first and second layers 12 and 13 are formed to conform to the size of the screen. When the first layer 12 and the second layer 13 have been stacked on one another, the deposited ITO layer of the first and second layers 12 and 13 are arranged in a lattice form wherein the ITO layer of the first layer and the ITO layer of the second layer cross each other at a right angle. That is, if the ITO layer of the first layer 12 are arranged in the X-axis direction, the ITO layer of the second layer 13 are arranged parallel to each other in the Y-axis direction.

In contrast, if the ITO layer of the first layer 12 are arranged in the Y-axis, the ITO layer of the second layer 13 are arranged in the X-direction. If a finger or the like touches a point on the touch screen part 10 when voltage is applied to the ITO layers of the first and second layers 12 and 13 to establish an electric field, an electrostatic capacitance or electric resistance is changed at the touched point, thereby producing a drop phenomenon, which allows the positional value of the touched point to be recognized.

The bending detection part 100 is provided on the touch screen part 10, in which the bending detection part 100 is so flexible that it can be bent together with the flexible touch screen part 10 when the touch screen part 10 is bent. Upon being bent, the capacitance or electric resistance of the bending detection part 100 is changed, which allows bending information for a bent location B of the touch screen part to be detected. The bending information may include various detected results. For example, depending on a difference in measured electrostatic capacitance or electric resistance, the position, angle or the like of the bent location B can be detected.

Figure 3:
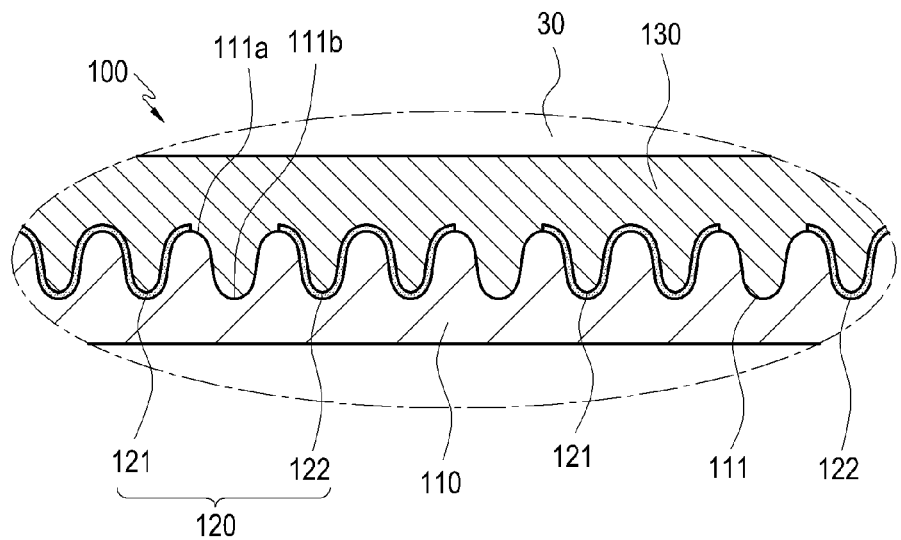
FIG. 3 illustrates an enlarged view of a part indicated by arrow A in FIG. 2.
Figure 4:
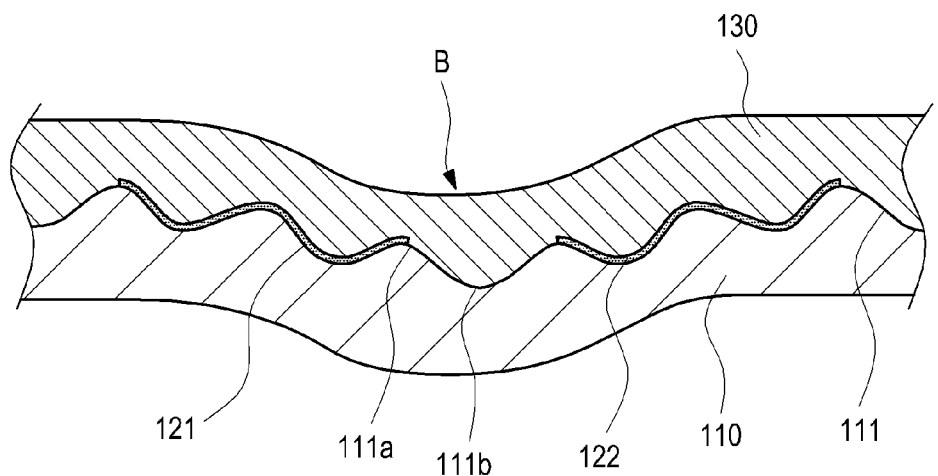
FIG. 4 illustrates an operating condition of a bending detection part when a screen is bent or folded in the flexible display device in accordance with the first embodiment.

FIG. 3 illustrates the part indicated by arrow A in FIG. 2, in which the bending detection part provided on the bottom side of the touch screen part is shown in an enlarged scale, and FIG. 4 illustrates an operating condition of a bending detection part when a screen is bent or folded in the flexible display device in accordance with the first embodiment.

Figure 8:
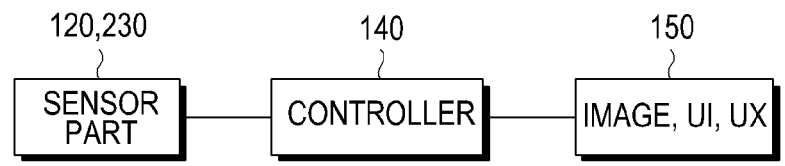
FIG. 8 illustrates a block diagram of the flexible display device in accordance with the first embodiment of the present invention.

Referring to FIGS. 3 and 4, the bending detection part 100 includes a sheet part 110, a sensor part 120, an insulation film 130, and a controller 140 (see FIG. 8).

The sheet part 110 is bonded to the bottom side of the touch screen part 10 to be flexibly deformable. One side of the sheet part 110 is formed as a wave-shaped part 111$b$ having a wave shape to increase variation of electrostatic capacitance or electric resistance in each of sensors 121 and 122, which will be described later. The wave-shaped part 111 has a plurality of peaks 111$a$ and valleys 111$b$, each of which has a predetermined height and area (see FIG. 3). If a location B of the touch screen part 10 is bent concavely or convexly, or is folded in one direction, the peaks 111$a$ and the valleys 111$b$ positioned at or adjacent to the bent or folded location B are changed in shape, thereby causing a change in electrostatic capacitance or electric resistance between the sensors 121 and 122.

The sensor part 120 includes a plurality of sensors 121 and 122 arranged adjacent to each other along the wave-shaped part 111, in which the electrostatic capacitance or electric resistance of each of the sensors is changed depending on the deformation of the wave-shaped part 111. The sensors 121 and 122 are provided in pairs to be adjacent to each other along the wave-shaped part 111. In other words, the sensors 121 and 122 are alternately arranged from one edge to the opposite edge on one side of the sheet part 110 to form plural pairs of sensors 121 and 122.

Each pair of the sensors 121 and 122 includes a pair of metal plates, i.e. a first metal plate 121 and a second metal plate 122.

The first metal plates 121 are provided along the curved surface of the wave-shaped part 111. The second metal plates 122 are provided along the curved surface of the wave-shaped part 111 in such a manner that each of the second plates is positioned adjacent to one first metal plate or interposed between two first adjacent metal plates. If the sheet part 110 is bent, the distance between two adjacent peaks 111a and/or the height from a valley 111b to a peak 111a adjacent to the valley 111b are changed, which will cause a change in electrostatic capacitance or electric resistance between the first and second metal plates 121 and 122 arranged at or adjacent to the bent position B. In addition, depending on the bent extent of the touch screen part 10, the shape of the wave-shaped part 111 is changed, which causes a change in electrostatic capacitance or electric resistance between the first and second metal plates 121 and 122 arranged on or adjacent to the bent location B. Through this, it is possible to accurately detect the angle and position of the bent location B.

Accordingly, when a location on the touch screen part 10 is bent, electrostatic capacitance or electric resistance between the first and second metal plates 122 provided on or adjacent to the bent location B is changed, and the bent position or bent angle of the touch screen part 10 can be determined depending on the variation of the electrostatic capacitance or electric resistance. Through this, a controller 140 (see FIG. 8) receives bending information, and performs a control to correct an image displayed on a screen or to output an image suitable for a UI or UX (User eXperience) to the screen (see reference numeral 150 in FIG. 8).

In the present embodiment, the first and second metal plates 121 and 122 are preferably, but not exclusively, formed from Carbon NanoTubes (CNTs) or silver (Ag) NanoWires (AgNWs). Any other construction or material may be alternatively used instead of the CNTs or the AgNWs if the construction formed from the material is changed in terms of electrostatic capacitance or electric resistance depending on the change of the shape of the wave-shaped part 111 when the construction formed from the material is provided on the wave-shaped part 111.

The insulation film 130 is provided on the top of the wave-shaped part 111 so as to insulate the touch screen part 10 from the sensor part 120 and to adhere the sensor part 120 to the wave-shaped part 111. The insulation film 130 is preferably, but not exclusively, formed from $SiO_2$. Any other material may be employed instead of $SiO_2$ if the material insulates the touch screen part 10 from the sensor part 120 and allows the sensor part 120 to be adhered to the touch screen part 10.

The first metal plate 121 and the second metal plate 122 are alternately arranged and are adjacent to each other on the wave-shaped part 111, and each has a wave shape from a peak 111a to another peak 111a with a predetermined interval between the peaks. However, this is merely an example, and various variants may be made within the scope of the present invention, such as the first and second metal plates 121a and 122a in FIGS. 5 and 7 or the first and second metal plates 121b and 122b in FIG. 6, which have a different shape than the first and second metal plates 121 and 122 of the first embodiment. In addition, FIG. 7 illustrates the first and second metal plates shown in FIG. 5 in a bent state.

Figure 5:
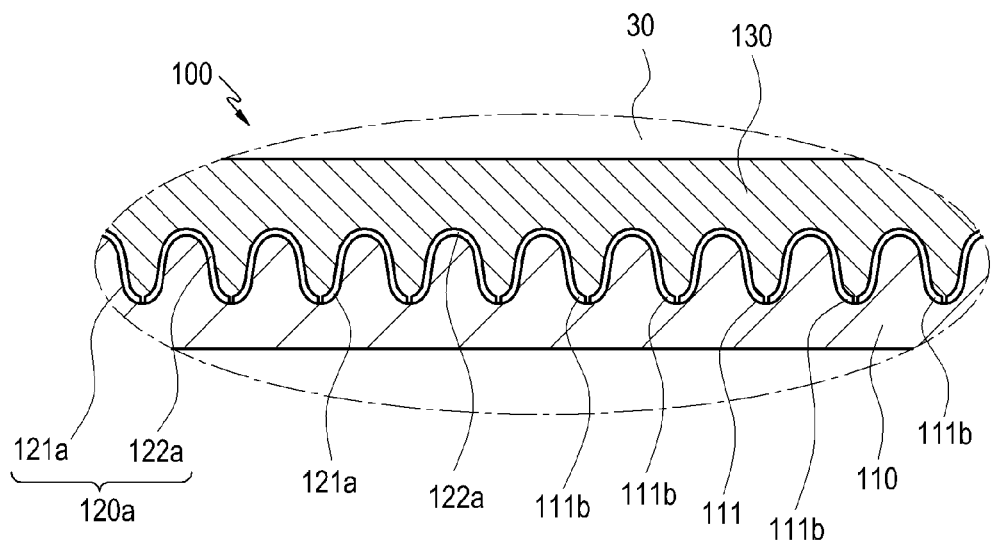
FIGS. 5 and 6 illustrate other shapes of first and second metal plates which may be employed in the flexible display device in accordance with the first embodiment.

As shown in FIG. 5, a first metal plate 121a is formed on the wave-shaped part 111 with an interval of one pitch between two adjacent vallerys 111b and 111b, and a second metal plate 122a is adjacent to the first metal plate 121a and is formed on the wave-shaped part 111 with an interval of one pitch between two adjacent valleys 111b and 111b.

Figure 6:
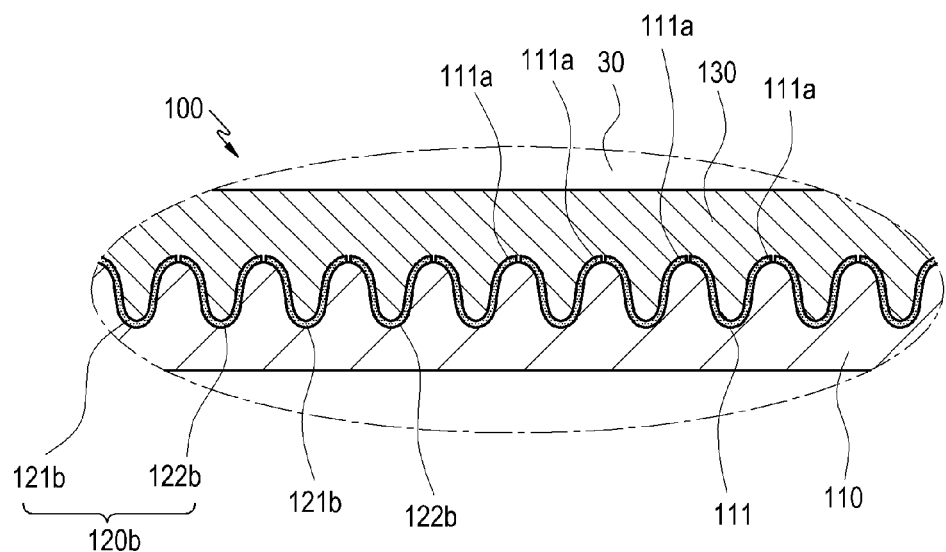
Figure 7:
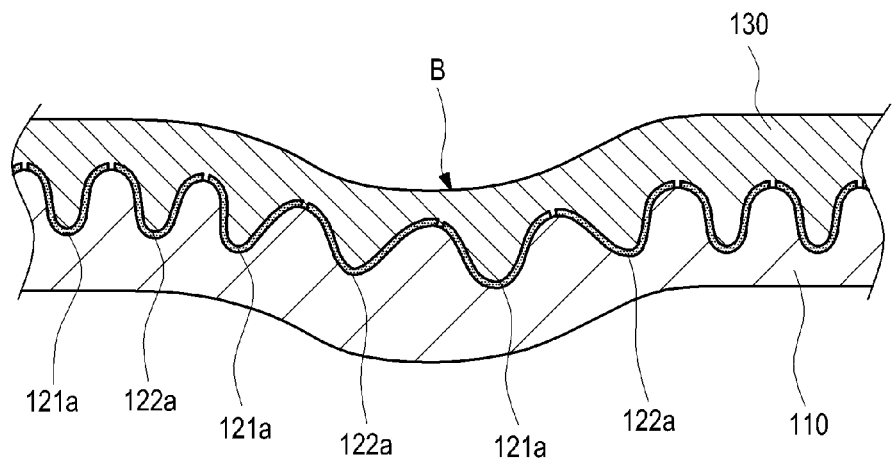
FIG. 7 illustrates the first and second metal plates shaped as shown in FIG. 5 in the flexible display device in accordance with the first embodiment in the bent state.

Otherwise, as shown in FIG. 6, a first metal plate 121b is formed on the wave-shaped part 111 with an interval of one pitch between two adjacent peaks 111a and 111a, and a second metal plate 122b is adjacent to the first metal plate 121b and is formed on the wave-shaped part 111 with an interval of one pitch between two adjacent peaks 111a and 111a. On condition that the first and second metal plates 121 and 122 may be provided in pairs on the wave-shaped part 111 in the manner described above, the first and second metal plates 121 and 122 may have variously modified shapes and sizes.

If the flexible display device formed as described above is bent, the shape of the wave-shaped part 111 will be changed depending on the bent extent of the touch screen part 10. The electrostatic capacitance or electric resistance between each pair of adjacent first and second plates 121 and 122 arranged on the wave-shaped part is changed depending on the bent extent. Due to the difference in electrostatic capacitance or electric resistance between the pairs of the first metal plates 121 and second metal plates 122 positioned on or adjacent to the bent location B, it is possible to accurately detect the bent angle as well as the bent position. Since the bent position or bent angle of the touch screen part 10 is determined depending on the variation of electrostatic capacitance or electric resistance, the controller 140 (see FIG. 8) to be described below receives bending information, and performs a control to correct an image displayed on a screen or to output an image suitable for a UI or UX to the screen (see reference numeral 150 in FIG. 8).

FIG. 8 illustrates the flexible device in accordance with the first embodiment.

Referring to FIG. 8, the controller 130 controls an image displayed on the screen based on a value detected by the sensor part 120 (see reference numeral 150 in FIG. 8). That is, the controller 140 receives bending information detected by the sensor part 120 and performs a control to correct an image displayed on the screen depending on the position or bent angle of the bent location B or to output an image suitable for a UI or UX to the screen.

Figure 9:
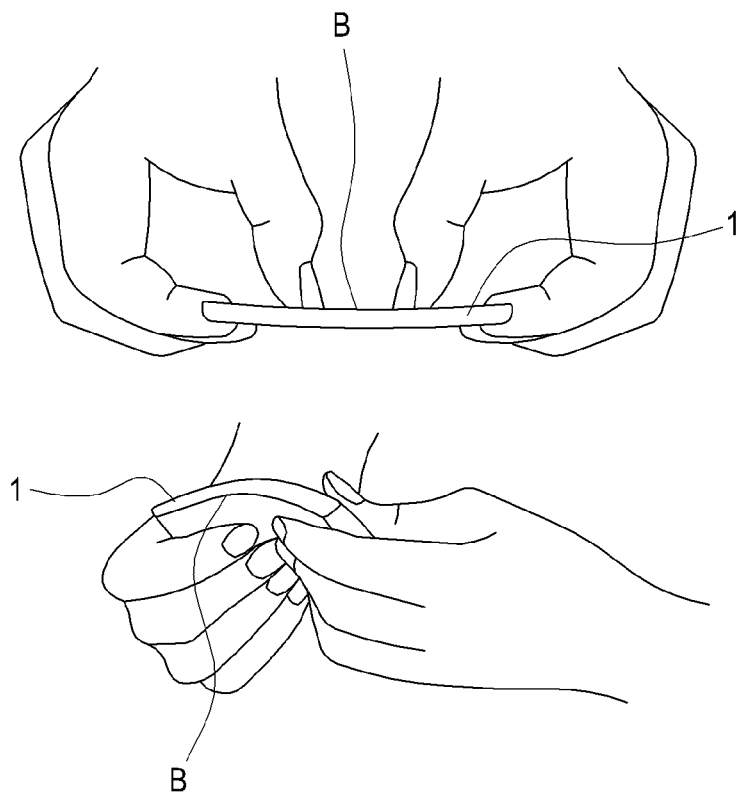
FIG. 9 illustrates how the flexible display device in accordance with the first embodiment can be bent concavely or convexly.

FIG. 9 illustrates how the flexible display device in accordance with the first embodiment can be bent concavely or convexly. Referring to FIG. 9, when a location B on the top of the touch screen part 10 is bent convexly or concavely, the controller 140 performs a control to zoom in or zoom out an image displayed on the touch screen part 10.

Figure 10:
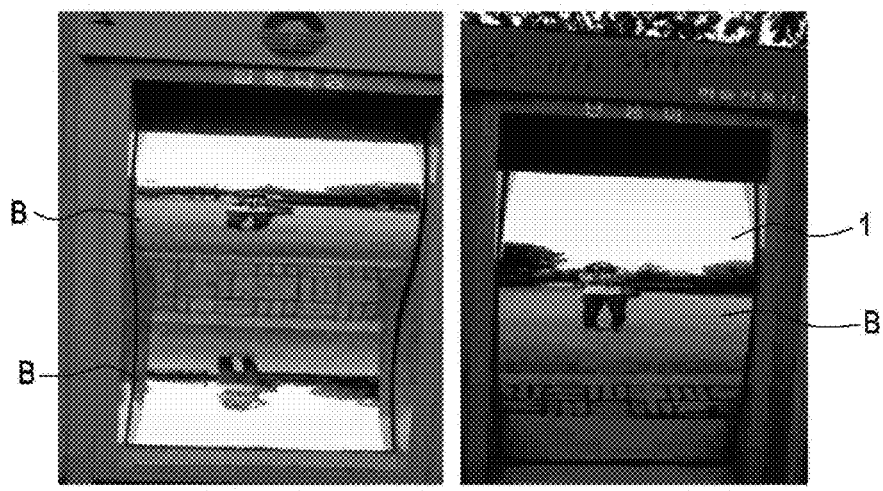
FIG. 10 illustrates images displayed on the flexible display device in accordance with the first embodiment, in which the right side of the figure shows an image displayed when the flexible display device is bent concavely and the left side shows an image displayed when the flexible display device is bent convexly.

FIG. 10 illustrates images displayed on the flexible display device in accordance with the first embodiment, in which the right side of the figure shows an image displayed when the flexible display device is bent concavely and the left side shows an image displayed when the flexible display device is bent convexly. Referring to FIG. 10, the image displayed on the screen can be converted in accordance with the bending information transmitted to the controller 140. That is, in accordance with the flexed state of the flexible display device 1, the image displayed on the screen can be variously converted, such as into a 3D image form or in a vertically reversed form.

Figure 11:
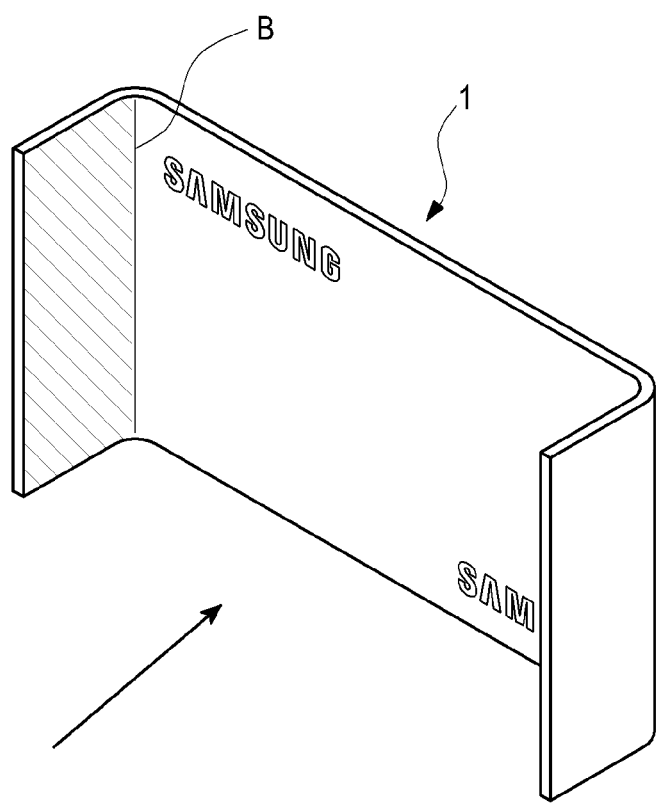
FIG. 11 illustrates the flexible display device in accordance with the first embodiment in a folded state.

FIG. 11 illustrates the flexible display device in accordance with the first embodiment in the folded state. Referring to FIG. 11, if the flexible display device 1 is cradled and bent in at least one location B over an angle, the controller 140 performs a control in such a manner that the screen blacks out one or more areas, which are positioned out of user's sight due to the bending of the flexible display device 1, so that no image is displayed on the areas. Thereby, the power consumption of the flexible display device 1 is reduced.

Accordingly, it is possible to output an image corrected on the basis of information for the bent location B in the flexible display device 1, such as a bent position, direction, or angle, or to variously implement the UI and UX (see reference numeral 150 in FIG. 8).

Figure 12:
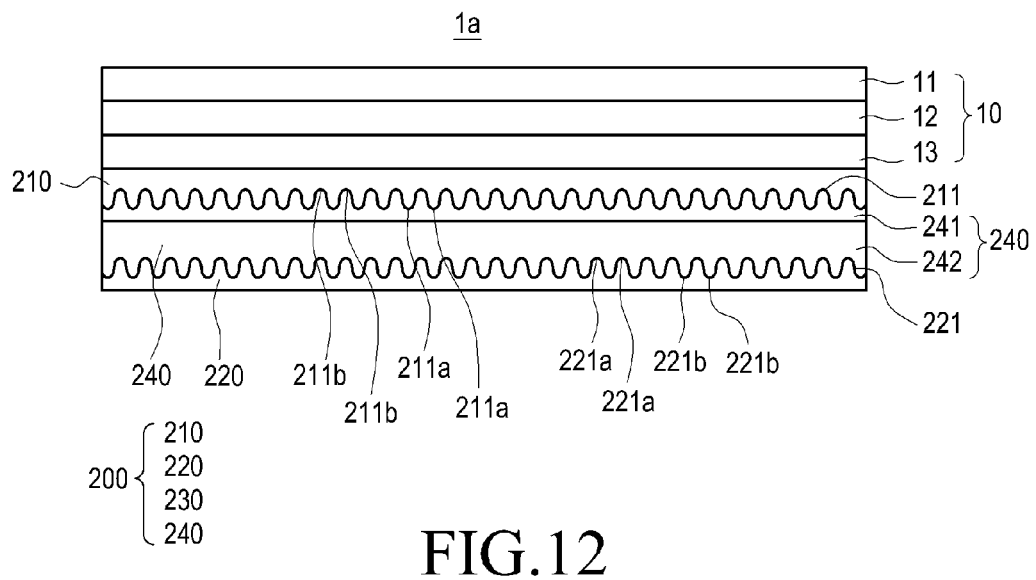
FIG. 12 illustrates a flexible display device in accordance with a second embodiment of the present invention.
Figure 13:
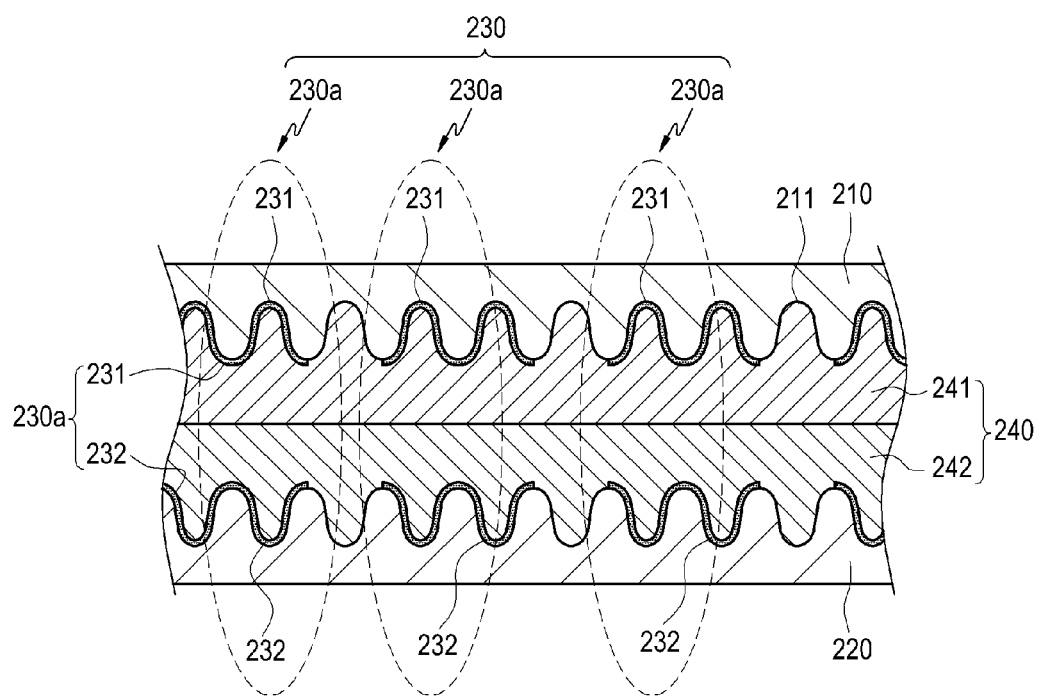
FIG. 13 illustrates a bending detection part in the flexible display device in accordance with the second embodiment of the present invention in an enlarged scale.

FIG. 12 illustrates a flexible display device in accordance with the second embodiment of the present invention, and FIG. 13 illustrates a bending detection part in the flexible display device in accordance with the second embodiment of the present invention in an enlarged scale.

Referring to FIGS. 12 and 13, the flexible display device 1a in accordance with the second embodiment includes a touch screen part 10 and a bending detection part 200. The second embodiment employs a different construction for the bending detection part as compared to the first embodiment.

That is, the bending detection part 200 includes a first sheet part 210, a second sheet part 220, a sensor part 230, an insulation film 240, and a controller 140 (see FIG. 8).

The first sheet part 210 is bonded to the bottom side of the touch screen part 10 to be flexibly deformable and has a first wave-shaped part 211 formed in a wave shape on the top side thereof, and the second sheet part 220 is bonded to the bottom side of the first sheet part 210 to be flexibly deformed and has a second wave-shaped part 221 formed in a wave shape on the bottom side thereof opposite to the first wave-shaped part 211.

Each of the first and second wave-shaped parts 211 and 221 has a wave shape so that variable electrostatic capacitances or electric resistances of sensors 231 and 232, to be described below, can be substantially changed. In the second embodiment, each of the first and second wave-shaped parts 211 and 221 has a predetermined height and area and the peaks 211a and 221a and valleys 211b and 221b oppose each other. However, any other shape that enables changing of the electrostatic capacitances or electric resistances between the sensors 231 and 232, which are provided on one of the first wave-shaped part 211 and the second wave-shaped part 221. For example, it is possible to provide the peaks 211a and the valleys 211b of the first wave-shaped part 211 to oppose the valleys 221b and the peaks 221a of the second wave-shaped part 221, respectively.

If the touch screen part 10 is bent concavely or convexly, or folded unidirectionally, the peaks 211a and 221a and valleys 211b and 221b positioned at or adjacent to the bent location incur a deformation in shape, and there is a change in the electrostatic capacitances or electric resistances between the peaks 211a and 221a and the valleys 211b and 221b.

Each of the first and second wave-shaped parts 211 and 221 is provided with the sensor part 230, which includes sensors 230a that oppose provided on the first wave-shaped part 211 and the second wave-shaped part 221, respectively. Plural pairs of sensors 230a are provided along the first and second wave-shaped parts 211 and 221, respectively, in such a manner that the sensors 230a in each pair are adjacent to each other. As a result, when the touch screen part 10 is bent, the electrostatic capacitances or electric resistances between the sensors 230a positioned opposite to and adjacent to each other in each pair are changed depending on the bent extent of the touch screen part 10.

The sensors 230a in each pair include a first metal plate 231 and second metal plate 232. Plural first metal plates 231 are arranged along a first curved surface on the first wave-shaped part 211 to be adjacent to each other. Plural second metal plates are arranged on a second curved surface on the second wave-shaped part 221 to be adjacent to each other and to oppose the first metal plates 231, respectively.

In FIGS. 12 and 13 according to the second embodiment of the present invention, each of the first metal plates 231 is formed on the first wave-shaped part 211 and extends from one peak 211a to another peak 211a adjacent to but spaced from the one peak 211a by an interval, and each of the second metal plates 231 is formed along the top surface of the second wave-shaped part 220 to extend from one peak 221a to another peak 221a adjacent to but spaced from the one peak 211a by an interval. However, the shapes of the first and second metal plates 231 and 232 may be variously modified. For example, the first metal plates 231 may be formed on the first wave-shaped part 211 with one pitch interval, and the second metal plates 232 may be formed on the second wave-shaped part 221 with one pitch interval opposite the first metal plates 231, respectively, so that the electrostatic capacitances or electric resistances can be varied depending on the difference in interval between the first and second metal plates 231 and 232, which is caused due to the bending of the touch screen part.

If the touch screen 10 is bent, the first and second sheet parts 210 and 220 will be also bent, which will cause the distance between two adjacent peaks 211a (or two adjacent valleys 211b) and the height between one peak 211a and one valley 211b adjacent to the one peak on the first wave-shaped part to be changed, and which will also cause the distance between two adjacent peaks 221a (or two adjacent valleys 221b) and the height between one peak 221a and one valley 221b adjacent to the one peak on the second wave-shaped part to be changed.

If the distance between the first and second wave-shaped parts 211 and 221 is changed, the distance between the first and second metal plates 231 and 232 will also be changed, which will cause the electrostatic capacitances or electric resistances between the first and second metal plates 231 and 232 to be varied. Since the change in distance between the first and second wave-shaped parts 211 and 221 is varied depending on the bent extent of the touch screen part 10, a change in distance caused between the first and second metal plates 231 and 232 in one pair is different from that caused between the first and second plates 231 and 232 in one adjacent pair, which are positioned at or adjacent to the bent location B (see FIGS. 9 and 10).

As a result, a difference in electrostatic capacitance or electric resistance occurs between the adjacent pairs of sensors 230a. Accordingly, the sensor part 230 can accurately detect the bent angle as well as the bent position. Such bending information is transmitted to the controller 140 (see FIG. 8), which performs a control to correct an image displayed on a screen to display the corrected image, or to output an image suitable for a UI or UX to the screen.

In the second embodiment, the first and second metal plates 231 and 232 are preferably, but not exclusively formed from Carbon NanoTubes (CNTs) or Ag NanoWires (AgNWs) as in the first embodiment. However, any other construction or material may be alternatively used instead of the CNTs or the AgNWs if the first and second metal plates formed from the material are installed opposite to each other and exhibit varying electrostatic capacitance or electric resistance depending on the change in distance therebetween.

The insulation film 240 is interposed between the first and second wave-shaped parts 211 and 221 so as to allow the sensors 230a to be attached opposite to each other, respectively. The insulation film 240 includes a first insulation layer 241 and a second insulation layer 242, wherein the first insulation layer 241 is formed so as to adhere the first metal plates 231 onto the first wave-shaped part 211, and the second insulation layer 242 is formed so as to adhere the second metal plates 232 onto the second wave-shaped part 241. In the second embodiment, the first and second insulation layers 241 and 242 are preferably, but not exclusively formed from $SiO_2$. However, any other material or construction may be alternatively employed if the material and construction can accomplish the insulation and adhering functions as described above.

The controller 140 (see FIG. 8) controls an image on the screen in accordance with one or more detected values obtained through the sensor part 230. Specifically, the controller 140 receives bending information (such as bent position or bent angle) determined by a difference in electrostatic capacitance or electric resistance between the first and second metal plates 231 and 232, the difference being caused by bending the touch screen part 10, and then the controller 140 corrects an image displayed on the screen or displays the image in accordance with a UI or UX.

For example, if one location B on the touch screen part 10 is bent convexly or concavely, the controller 140 can perform a control to zoom in or zoom out the image displayed on the screen (see FIG. 9). In addition, in accordance with the flexed condition of the flexible display device, the controller 140 can perform a control to convert the image displayed on the screen into a 3D image form or a vertically reversed form (see FIG. 10). If the flexible display device 1a is bent over a predetermined angle and one or more areas of the screen are caused to be positioned out of the user's sight, the controller 140 can perform a control to black out the areas (see FIG. 11).

Accordingly, the bending detection part 100 in accordance with the first embodiment and the bending detection part 200 in accordance with the second embodiment are provided on the bottom side of the touch screen to be flexibly deformable, so that the electrostatic capacitance or electric resistance thereof is changed in accordance with the bent position of the touch screen part. As a result, on the basis of the bending information, it is possible to detect bending information at a bent location, to correct an image on the touch screen, or to output the information to be suitable for a UI or UX.

As discussed above, since the inventive flexible display device includes a bending detection part on the bottom side of a touch screen part, a bent, flexed or folded position or angle can be accurately detected.

Since an image displayed on a screen is compensated or a UI or UX correction is performed on the basis of the bending information, a user's viewing of the image is substantially improved.

Furthermore, since the position or the bent or folded extent of a bent or folded location can be detected, and an area of a screen, on which an image does not need to be displayed, can be blacked out based on the detected information, power consumption is thereby reduced.

While the invention has been shown and described with reference to certain embodiments thereof, it will be understood by those skilled in the art that various changes in form and details may be made therein without departing from the spirit and scope of the invention as defined by the appended claims.

What is claimed is:

1. A flexible display device, comprising:
 a flexible touch screen; and
 a deformation detection sheet which is positioned on the flexible touch screen and can be deformed along with the flexible touch screen, the deformation detection sheet comprising a wave-shaped part formed at one surface of the deformation detection sheet and a plurality of sensors which are arranged along a curved surface of the wave-shaped part to be adjacent to each other, each of the plurality of sensors having a waved shape;
 wherein the deformation detection sheet detects deformation of the flexible touch screen based on an electric property between at least two sensors which are adjacent to each other among the plurality of sensors if the deformation detection sheet is deformed along with the flexible touch screen.

2. The flexible display device as claimed in claim 1, wherein the touch screen comprises:
 a top film;
 a first layer provided beneath the top film, the first layer including multiple strips of Indium Tin Oxide (ITO) deposited in a first direction; and
 a second layer including multiple strips of ITO deposited in a second direction that is perpendicular to the first direction.

3. The flexible display device as claimed in claim 2, wherein the top film is formed from Polyethylene Terephthalate (PET), PolyCarbonate (PC), PolyMethylMethAcrylate (PMMA), PolyEthyleneNaphthalate (PEN), PolyEtherSulfone (PES), Cyclic Olefin Polymer (COP), glass, or tempered glass.

4. The flexible display device as claimed in claim 1, wherein the deformation detection sheet further comprises a controller for controlling an image on a display in accordance with one or more detected values obtained by the sensors.

5. The flexible display device as claimed in claim 4, wherein each of the sensors comprises:
 a first metal plate provided along a curved surface of the deformation detection sheet; and
 a second metal plate provided along the curved surface to be adjacent to the first metal plate,
 wherein when the deformation detection sheet is bent, an electrostatic capacitance or electric resistance between the first and second metal plates at a bent location is changed.

6. The flexible display device as claimed in claim 5, wherein the first and second metal plates comprise Carbon NanoTubes (CNTs) or Ag NanoWires (AgNWs).

7. The flexible display device as claimed in claim 6, wherein when a location on the touch screen is bent, the bent location or bent angle of the touch screen is determined in accordance with a change in the electrostatic capacitance or electric resistance between the first and second metal plates provided on or adjacent to the bent location.

8. The flexible display device as claimed in claim 7, wherein when an upper surface of the touch screen is bent convexly or concavely, the controller performs a control to zoom in or zoom out an image displayed on the touch screen.

9. The flexible display device as claimed in claim 7, wherein when one side of the touch screen is bent over an angle, the controller performs a control to black out one or more areas that are positioned out of a user's sight due to the bending.

10. The flexible display device as claimed in claim 1, wherein the deformation detection sheet has
 an insulation film is formed on an upper surface of the wave-shaped part to adhere the sensors to the wave-shaped part.

11. A flexible display device, comprising:
 a flexible touch screen part; and a bending detection part provided on the touch screen part, the bending detection part having an electrostatic capacitance or electric resistance, which changes depending on a bending of the touch screen part, wherein the bending detection part comprises:
a first sheet part bonded to a lower side of the touch screen part to be flexibly deformable, the first sheet part having a first wave-shaped part formed on one side of the first sheet part in a wave shape;
a second sheet part bonded to a lower side of the first sheet part to be flexibly deformable, the second sheet part having a second wave-shaped part formed on one side of the second sheet part in a wave shape; and
a sensor part comprising plural sensors provided on the first and second wave-shaped parts in such a manner that the sensors provided on the first wave-shaped part are positioned opposite to the sensors provided on the second wave-shaped part, respectively,
wherein the plural sensors provided on the first wave-shaped part are arranged along a curved surface of the first wave-shaped part and the plural sensors provided on the second wave-shaped part are arranged along a curved surface of the second wave-shaped part;
wherein an electrostatic capacitance or electric resistance between each of the sensors changes in accordance with bending of the sensor depending on a deformation of the first wave-shaped part and the second wave-shaped part, and
wherein each of the sensors detects the changes of the electrostatic capacitance or electric resistance.

12. The flexible display device as claimed in claim 11, the sensor part further comprising a controller for controlling an image on the screen based on the detection of the sensor part.

13. The flexible display device as claimed in claim 12, wherein each of the sensors comprises:

a first metal plate provided on a first curved surface of the first wave-shaped part; and
a second metal plate provided on a second curved surface of the second wave-shaped part,
wherein when the touch screen part is bent, the electrostatic capacitance or electric resistance between the first and second metal plates is changed.

14. The flexible display device as claimed in claim 13, wherein a first insulation layer is formed on the wave-shaped part to adhere the first metal plates to the first wave-shaped part, and a second insulation layer is formed on the second wave-shaped part to adhere the second metal plates to the second wave-shaped part.

15. The flexible display device as claimed in claim 13, wherein the first and second metal plates comprise Carbon NanoTubes (CNTs) or Ag NanoWires (AgNWs).

16. The flexible display device as claimed in claim 13, wherein when a location on the touch screen part is bent, the bent location or bent angle of the touch screen part is determined in accordance with a change in electrostatic capacitance or electric resistance between the first and second metal plates provided at the bent location.

17. The flexible display device as claimed in claim 16, wherein when an upper surface of the touch screen part is bent convexly or concavely, the controller performs a control to zoom in or zoom out an image displayed on the touch screen part.

18. The flexible display device as claimed in claim 16, wherein when one surface of the touch screen part is bent over an angle, the controller performs a control to black out one or more areas that are positioned out of a user's sight due to the bending.

* * * * *